US009574671B1

(12) United States Patent
Amberg et al.

(10) Patent No.: US 9,574,671 B1
(45) Date of Patent: Feb. 21, 2017

(54) DETERMINING COMMUNICATION MODES OF A MOBILE DEVICE BASED ON PRESENCE INFORMATION

(75) Inventors: Mark F. Amberg, Singapore (SG); Linadewi S. Amberg, Singapore (SG)

(73) Assignee: Avaya Inc., Basking Ridge, NJ (US)

( * ) Notice: Subject to any disclaimer, the term of this patent is extended or adjusted under 35 U.S.C. 154(b) by 1688 days.

(21) Appl. No.: 12/131,313

(22) Filed: Jun. 2, 2008

(51) Int. Cl.
  H04M 3/42 (2006.01)
  F16K 1/30 (2006.01)
  F02M 65/00 (2006.01)
  H04W 4/02 (2009.01)
  H04W 64/00 (2009.01)

(52) U.S. Cl.
  CPC .............. *F16K 1/302* (2013.01); *F02M 65/00* (2013.01); *H04W 4/02* (2013.01); *H04W 4/023* (2013.01); *H04W 64/00* (2013.01)

(58) Field of Classification Search
  CPC ....... H04W 4/02; H04W 64/00; H04W 4/023; H04W 4/028; H04W 4/04; H04W 64/003; H04W 48/16; H04W 4/025
  USPC ... 455/414, 456.1, 435.1, 456.4, 422.1, 418, 455/419, 456.2, 569, 563, 566, 345, 41.1, 455/41.2, 11.1, 405, 411, 412.2, 552.1, 455/556.1, 574, 67.11, 456.3, 404.2; 709/220; 370/328, 338, 352; 375/256, 375/342, 464, 456.6; 379/211.2, 88.19
  See application file for complete search history.

(56) References Cited

U.S. PATENT DOCUMENTS 5,572,221 A * 11/1996 Marlevi et al. ....... H04W 28/18
  342/452
7,221,939 B2  5/2007 Ylitalo et al.
2003/0114202 A1 * 6/2003 Suh et al. ..................... 455/569
2003/0126216 A1 * 7/2003 Avila et al. ................... 455/419
2003/0134626 A1 * 7/2003 Himmel et al. .............. 455/419
2005/0191969 A1 * 9/2005 Mousseau .................... 455/90.2
2005/0208950 A1 * 9/2005 Hasse ............................. 455/453
2005/0245233 A1 * 11/2005 Anderson ............... H04L 63/08
  455/411
2005/0250537 A1 * 11/2005 Narea .......................... 455/558
2007/0291859 A1 * 12/2007 Maes ............................ 375/256
2008/0002820 A1 * 1/2008 Shtiegman et al. ..... 379/211.02
2008/0042898 A1 * 2/2008 Sharma ........................ 342/450
2008/0098297 A1 * 4/2008 Sun et al. ..................... 715/234

(Continued)

OTHER PUBLICATIONS

"Presence-Based Services Demo Pasta & Presence Zones", http://www-03.ibm.com/industries/telecom/doc/content/bin/CTIA_Pasta_PZ.pdf, CTIA Wireless 2007, 10 pp., IBM Corporation.

(Continued)

*Primary Examiner* — Fred Casca

(74) *Attorney, Agent, or Firm* — Sheridan Ross P.C.

(57) ABSTRACT

A method and system of dynamically updating presence, capabilities and identity information based on environmental conditions using environment information of a user of a mobile device. One or more wireless networks or devices or both are detected using at least one wireless interface of the mobile device. Thereafter, presence information of the user of the mobile device is generated based on the mobile device's location. Next, either a mode of the mobile device is set in accordance with the presence information or communication handling preferences are configured for the user of the mobile device based on the presence information or preferences of applications on the mobile device are configured.

39 Claims, 3 Drawing Sheets

(56) References Cited

U.S. PATENT DOCUMENTS

| | | |
|---|---|---|
| 2008/0167050 A1* | 7/2008 | Songer et al. ............. 455/456.3 |
| 2008/0248749 A1* | 10/2008 | Bahl et al. ................... 455/41.2 |
| 2008/0253361 A1* | 10/2008 | Hsu et al. ..................... 370/352 |
| 2009/0131080 A1* | 5/2009 | Nadler et al. .............. 455/456.3 |
| 2009/0154439 A1* | 6/2009 | Igarashi et al. ............... 370/338 |
| 2009/0255000 A1* | 10/2009 | Winterbottom et al. ....... 726/28 |

OTHER PUBLICATIONS

"IBM Telecommunications Capitalize on new growth opportunities" Internet Article found at http://www-935.ibm.com/services/us/gbs/bus/html/bcs_telecom . . . printed Mar. 2, 2010, 3 pages.

\* cited by examiner

DETERMINING COMMUNICATION MODES OF A MOBILE DEVICE BASED ON PRESENCE INFORMATION

FIELD OF THE INVENTION

The present system and method relate to dynamically updating a mobile device's presence, capabilities and identity information based on environmental conditions. More particularly, the method dynamically updates the presence status, capabilities and identity information by leveraging the wireless networks that are detected at the mobile device.

BACKGROUND

With the advancement in technology, the capabilities of mobile devices such as mobile phones, laptops, personal digital assistants (PDAs) and the like are highly enhanced. This enables service providers to extend various services like call forwarding, voicemail, etc. to its subscribers who use such devices. A subscriber may subscribe to one or more of these services to ensure, for example, that phone calls or messages are not missed during the subscriber's unavailability. For example, a subscriber/user may not be available to receive a call when in a meeting and may therefore subscribe to call forwarding service offered by the service provider. The unavailability of the user may either be tracked or, where applicable, defined by the user to set their communication preferences.

Several solutions have been proposed in the art to set communication preferences of a user during their unavailability. In accordance with one proposed solution, a user's availability or willingness to answer or attend a call can be shared with the caller using the concept of 'presence'. For example, in SIP (Session Initiation Protocol) telephony, the SIP presence information of a user may be tracked in connection with their activity on a computer terminal to indicate availability/unavailability. The call may then be routed using the SIP presence information. For example, a call placed to a user's SIP telephone when the presence status of that user is 'away', may be redirected to the user's mobile phone by the SIP network. Alternatively, the user may manually update their current presence which can then be used to define their communication preference.

In accordance with another proposed solution, the information of user activity on a networked computing device on which a user is logged on is utilized to update the user's presence status. The presence status is determined by monitoring various kinds of user activities on the user device such as the user's activity on a productivity program, such as a word processor, or on an application that performs or monitors telephony activity. The former activity would result in a status such as "Online" while the latter activity would result in a status such as "On the Phone" for the monitored users. Presence indicators are now also being extended by leveraging the user's schedule, for example, their Calendar in Microsoft® Outlook®, to refine their presence status. When the user's Calendar indicates that they are in a meeting, their presence status, when linked to the Calendar, is changed to a status such as 'Busy'. The appropriate presence status may then be published to a presence server. The published presence status may cause, for example, a telephone call placed to a user's regular (landline) telephone to be routed to the user's mobile telephone.

Another known solution uses installed infrastructure for tracking user devices. In this solution, installed wireless devices such as Bluetooth devices are used to track and determine the location of a user device. Alternately, other tracking mechanisms such as GPS can be used to track a user device. The tracking and location data thus gathered is stored at a central location and used for updating user presence status. The user device in this solution does not generate or update presence information, and neither can it modify its own functionality or communication handling preferences such as call redirections.

Thus, the above proposed solutions are either scheduled/logged-in based implementations for updating the presence information of a user or use an installed infrastructure for tracking a user device for dynamic presence status updates. In addition, most known solutions are not directed toward a user's device dynamically updating the user's presence information when, for example, either the user moves from one location to another or when the surrounding wireless environment of the user changes. Similarly, in most known solutions, a user device does not update the presence status depending on a user's location inside a building or depending on whom they are occupying that space with. Thus, an incorrect presence status would be available for a user engaged in an ad-hoc hallway meeting or, for example, when a user needs to change conference rooms for a meeting because their originally scheduled room is unavailable. As a result, impromptu meetings can be interrupted by unwanted telephone calls and/or, in a corporate environment, team members may have difficulty finding the user whose presence is required.

Some proposed solutions track the user's location to update the presence status. These solutions propose to infer the user's location at any point of time based on the known wireless networks detected at the user device at that point of time. The user device may be programmed to update that user's status information as well as mode settings of the user's device depending on the particular wireless network(s) detected. However, in practice, location information inferred using only information about the wireless networks in range is often inaccurate. For example, there may be a wireless network available at the entrance/exit gate of a building, and mobile devices may be configured to toggle their "inside the building"/"outside the building" location state whenever this wireless network is detected. However, the user of the mobile device may walk up from inside the building to the gate to, for example, receive someone at the reception of the building, and then return back and remain in the building. In this case, the user's mobile device may erroneously infer that the user has exited the building. Such erroneous inferences may increase manifold in cases where there may be, for example, a meeting room or a cafeteria close to the exit of the building.

In addition, known solutions use presence information locally, and none of the known solutions propose to update the presence information to a remote server for managing telecommunications for the user. Further, in known solutions, location and corresponding updates to presence information or device mode are inferred using known wireless networks only. None of the known solutions proposes a way of managing user presence or device mode while the device is near unrecognized wireless networks. Lastly, according to known solutions, the behavior of the user device while it is near a known wireless network is statically configured. For example, the user device may be programmed to update the user presence to "busy" and device mode to "silent" whenever a wireless network known to designate a meeting room is in range. None of the known solutions propose a way to dynamically reprogram such device behavior based on the particular requirement at that time.

Thus, there is a need for an improved system and method in which a user device can dynamically fine tune the presence, capabilities and identity information of a mobile device by taking into account the user's environmental conditions and location.

SUMMARY

A method is directed towards dynamically fine tune presence, capabilities and identity information of a mobile device based on environmental conditions. Presence information of a user of a mobile device or a device's identity may dynamically change based on environmental conditions. In an embodiment, one or more wireless networks are detected using at least one wireless interface of the mobile device. Thereafter, the location of the mobile device is identified based upon the sequence in which the wireless networks are detected at the mobile device which provides information to avoid unnecessary switching but at the same time to prevent loss of connection. Further, presence information of the user of the mobile device is generated based on the mobile device's location. Next, either a mode of the mobile device is set in accordance with the presence information or communication handling preferences are configured for the user of the mobile device based on the environmental condition including presence information. Further, the presence information may optionally be updated to a presence server and applications running on the mobile device may be modified based on the environmental condition including presence information.

In another embodiment, broadcasting devices modify their identity or the information that they broadcast to allow the detecting device to modify it's profile accordingly. In this embodiment, for example, a Bluetooth device may change it's identity name from 'Conference Room A' to 'Conference Room A—Secure', depending on the participants in the conference room, such as Vice Presidents in a Corporation. In this embodiment, the broadcasting device could be programmed to disable recording applications until the Conference Room's broadcasting device returns toit's standard non-secure configuration.

In another embodiment, a method dynamically uses the environmental condition including presence of the mobile device. One or more wireless networks are detected and thereafter a change trigger is generated using a change trigger rule set, based at least partially on the detection. A profile setting is selected based at least partially on the change trigger and in accordance with the selected profile setting, at least one of:
  i) updating the presence information of the user of the mobile device;
  ii) setting a mode of the mobile device;
  iii) configuring communication preferences of the mobile device; and
  iv) modifying at least one application running on the mobile device is performed.

In accordance with yet another embodiment, a system comprises at least one wireless interface in the mobile device to detect one or more wireless networks and a first database maintaining at least one profile setting of the user. The profile setting defines at least one functionality parameter of the mobile device. The system also comprises a second database maintaining at least one change trigger rule set, and a processor running at least one process thread for executing the change trigger rule set to generate a change trigger. The change trigger rule set provides logical criteria for one or more change triggers to execute. The processor selects a profile setting based at least partially on the execution of a change trigger rule.

BRIEF DESCRIPTION OF DRAWING

The above and other aspects of the method and system will be apparent upon consideration of the following detailed description taken in conjunction with the accompanying drawings, in which like reference characters refer to like parts throughout, and in which.

DETAILED DESCRIPTION

Figure 1:
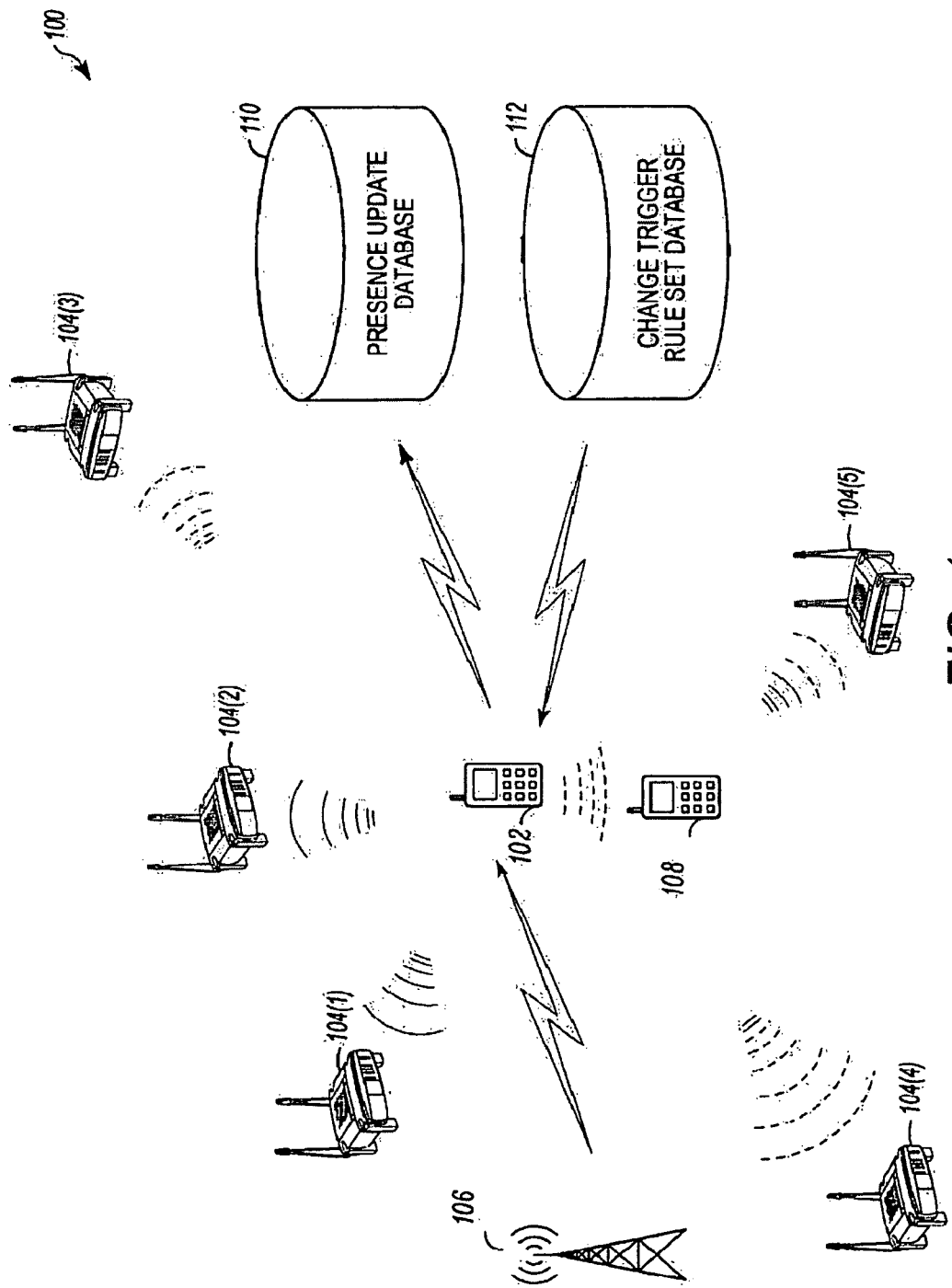
FIG. 1 represents an environment in which a mobile device may operate according to an exemplary embodiment.

FIG. 1 represents an environment 100 in which a mobile device 102 may operate according to an exemplary embodiment. The environment 100, without limitation, includes corporate setups and service provider setups. The mobile device 102 may be in the vicinity of different wireless networks for example, Wireless Fidelity (WiFi) network, telecommunication network and the like. WiFi network coverage may be provided by one or more wireless access points 104(1), 104 (2), 104(3), 104(4) and 104(5) situated at spatially separated locations. The wireless access points can be WiFi access points. Similarly, the mobile device 102 may also be in the range of a base station, for example, GSM base station 106. It will be apparent to a person skilled in the art that alternative wireless networks may be used to practice the teachings set forth in this disclosure, without deviating from the spirit and scope of the present invention. The alternative wireless networks may include, without limitation, Time Division Multiple Access (TDMA), Code Division Multiple Access (CDMA), or Third Generation (3G) networks. Another device 108 for example, a PDA or a mobile phone or a laptop, may act as a Bluetooth access point for the mobile device 102. Thus, the mobile device 102 may be in the vicinity of various networks like telecommunication network, Bluetooth network and the WiFi network. The mobile device 102 may be, for example, a laptop computer, a personal digital assistant (PDA), or a telephony-based communications device. The mobile device 102 may, optionally, also communicate with a presence update database 110 to update the user presence status on the presence update database 110. The presence status can be a status indicator that conveys ability and/or willingness of the user of the mobile device to communicate. The presence status may, for example, be maintained in a table depicting the mapping between the location of the user and their presence. An exemplary table depicting this mapping is shown in conjunction with Table 2. In an embodiment, the mobile device 102 updates the presence status in the presence update database 110 upon detection of the wireless networks in the vicinity of the mobile device 102 in accordance with one or more predefined criteria. The presence update database 110 is maintained at a presence server, for example, a Session Initiation Protocol (SIP) presence server.

The mobile device 102 downloads change trigger rule sets containing logic for change triggers from a change trigger rule set database 112. As described in further detail below, the change trigger rules are logical conditions that are programmed to trigger presence status change in response to changes in the user's current location, surrounding conditions, and availability status. A change trigger, in turn, contains instructions to change the presence status of the user of the mobile device 102 and could also be used to change/maintain the mode of the user's mobile device, configure communication preferences of the mobile device or configure applications running on the mobile device. In various embodiments, at least some of the change triggers are based on the sequence in which various wireless networks come into range of the mobile device, go out of range of the mobile device, or a combination of the above. The change triggers may also include criteria related to, without limitation, the time of day and the user's calendar. As described in further detail below, the mode settings may, for example, be setting a ring tone of the mobile device, setting the mobile device to a handsfree mode, setting the speaker phone mode of the mobile device or activating the auto-answer settings of the mobile device.

We now present some examples depicting the functionality offered by various embodiments. The user's mobile device may detect that the user is driving away from work and that the time is 5 pm, then an application on the mobile device may be configured to redirect all calls from co-workers to voicemail. On the other hand, the user may want to answer calls from either daycare or her spouse's work number during this time, so the mobile device may be configured to receive these calls. Further, the mobile device may be configured to automatically answer incoming calls (which have already been selected to be answered according to the aforementioned logic) after two rings during such travel, and operate in speakerphone mode to allow the user to take these calls without manually operating the mobile device.

In another example, the user may be operating from a home office and be logged into work via her work computer. Further, the user may be working on an important troubleshooting effort with a colleague in a remote location. The change trigger rule interacts with an application on the user's computer that shows that the user is communicating with only one individual, the remote colleague, and the user has set the priority of their current activity to 'critical'. So as a result of the change trigger rule, the mobile device may send information to the chat and presence server to prevent chat requests from other project members. The mobile device may further redirect calls from other project members to voicemail. Hence, the mobile device updates the user's presence status and computer identity to 'unavailable' for persons other than the remote colleague. The mobile device may further instruct the application on the user's computer to disable other applications that may serve as a distraction to the user at such a time, such as automatic updates for software. Thereby, the user can avoid unwanted communications as well as other distractions.

Figure 2:
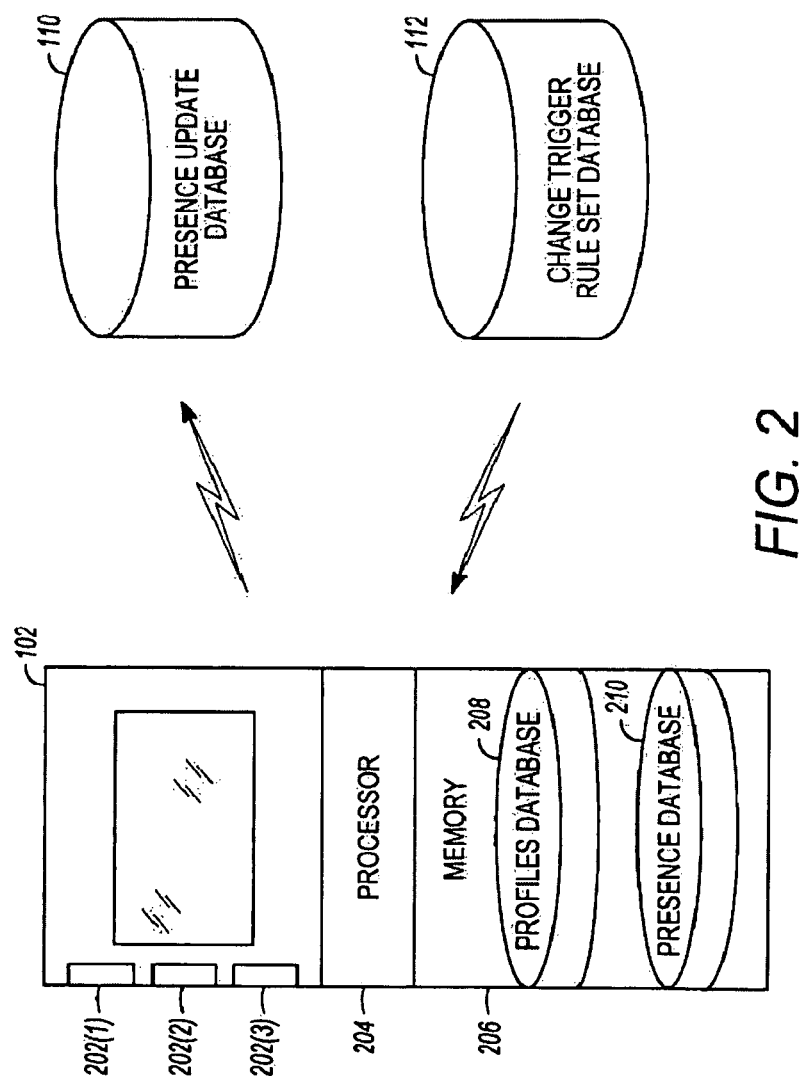
FIG. 2 depicts a block diagram of a system for dynamically updating the presence status in accordance with an embodiment.

FIG. 2 illustrates a block diagram of the mobile device 102 in further detail. The mobile device 102 may have multiple wireless interfaces 202(1), 202(2), 202(3) such as Bluetooth, WiFi, Infra Red and the like. Alternatively, the mobile device 102 may have a single wireless interface. The mobile device 102 also has a processor 204 and a memory 206. The memory 206 can be, for example, a dynamic or static random access memory. Other processing and memory means, including various computer readable media, may also be used for storing and executing program instructions. The memory 206 comprises a presence status database 210 for storing the presence status of the user. The memory 206 further comprises a profiles database 208 containing profiles that define at least one parameter for configuring the mode, communication preferences or applications of the mobile device 102. The profiles can be downloaded to the profiles database 208 from a profile settings server or the profiles can be automatically pushed to the mobile device 102 by the profile settings server. Profiles can also be created by the user of the mobile device by using an onboard user configuration interface. Such profiles provide information on, for example, the user's communication preferences in relation to the occurrence or non-occurrence of certain events. The preferences could include, for example, call forwarding to another number, switching to voicemail and the like. The profiles also provide information on the working of the mobile device including, without limitation, the mode in which the mobile device operates, the external communication devices it interfaces and the like.

According to an embodiment, as the user of the mobile device 102 changes their location, one or more of the wireless interfaces 202(1), 202(2), 202(3) detect different wireless networks associated with the access points 104 (1)-(5), another mobile device 108 or GSM base station 106. In addition to detecting wireless networks, the mobile device 102 may also detect the status of the surrounding environment as broadcasted by the surrounding wireless devices. This can be implemented by using, for example, a Bluetooth device name to encode a status of the environment, for example a secure environment. Once, one or more wireless networks are detected, the processor can identify and associate the wireless networks with the access points at various locations, by means of, for example, a Service Set Identifier (SSID) of the detected wireless network, device name and the like. Accordingly, the location of the user carrying the mobile device 102 may be determined using the SSID information along with optionally the status information broadcasted by the surrounding wireless devices. It should be noted that the objective of this detection is not to subscribe to those detected networks or accept connections to in-range devices, but to use the information to determine if changes should be made to the user's presence status. The location information is used to dynamically determine presence status of the user. Further, the location information may be utilized to figure out information on the surroundings of the user, for example, the people around him, since wireless networks of all the mobile devices in the vicinity are monitored. For example, if user's supervisor's device (such as a laptop, or another mobile device) is in-range, the mobile device may be configured enter the 'silent' profile, with all non-work related phone calls redirected to voicemail. In another example, if the user's spouse's mobile device is in-range and the time outside the user's work timings, the mobile device may be configured to redirect all work related phone calls to voicemail.

The memory 206 may also store change trigger rules sets downloaded from the change trigger rule sets database 112. The download can be initiated by a user command or upon user selection of services to be activated on the mobile device, or alternatively, the download can also be automatic. In an embodiment, the change trigger rule sets database 112 can be maintained at a separate server. The processor 204 executes separate process threads for each change trigger rule sets that are downloaded to the mobile device 102. These process threads can be activated by a user command or upon user selection of services to be activated on the mobile device subsequent to download of the change trigger rule sets. Alternatively, the thread initiation can also be automatic subsequent to download of the change trigger rule sets. Each change trigger rule set has logic defined in connection with one or more criteria for updating user presence status. These criteria can be triggering events which can be based on one or more of, but not limited to, the mobile device detecting a pre-defined wireless network, the mobile device detecting a plurality of wireless networks in a pre-defined sequence, the mobile device failing to detect a plurality of wireless networks in a pre-defined sequence, the mobile device detecting simultaneously a pre-defined set of wireless networks, a user manually overriding the presence status and the like.

These criteria can be used to monitor the movement of the user's mobile device as the user moves from one location to another or as the wireless environment surrounding the user changes, and thereby to update presence status dynamically. The trigger rule sets can, additionally, have criteria defined to trigger execution of another thread that would execute sequence(s) associated with the initial trigger. For example, in addition to executing possible device configuration changes and/or database updates, the new thread may also continue to monitor (or trigger another thread to monitor), for example, the loss of the signal that triggered it, or for signals that would trigger yet another set of actions or trigger another thread to perform configuration modifications, profile changes, or additional monitoring.

For example, the detection by a user's device of the WIFI network of the user's office could launch one or more threads that: i) monitor for the reduction of the WIFI signal strength to below a threshold value (since such a reduction of the signal strength would mean they are outside the range of other devices that might be monitored by threads focused on shorter range signaling devices); ii) monitor for devices and events that are applicable to the internal environment of the WIFI network within which the system is operating; iii) possibly launch a thread that registers the device with the WIFI network and synchronizes the device's onboard presence state with a registered presence server on the WIFI network; and iv) possibly launch a thread to retrieve new configuration rules for profile(s) on the device.

An exemplary embodiment is now described to illustrate how the location information can be used to identify presence status of the user. In a corporate environment, a number of mobile devices, for example, Blue Tooth devices may be placed, for example, in conference rooms, cafeterias, board rooms, lobby, etc., so that when users carrying mobile devices enter/pass though these area, their mobile devices detect the associated Blue Tooth devices corresponding to their physical location. The mobile device may include a location table in its memory to store the mapping between the SSIDs of the Blue Tooth device and the corresponding location. Exemplary table 1 is shown below.

TABLE 1

| S. No. | Wireless network detection | Location |
|---|---|---|
| 1 | Blue Tooth Network_Gate A | Gate A_access point |
| 2 | Blue Tooth Network_Gate B | Gate B_access point |

The wireless interface of the mobile device would detect the Bluetooth device when the user carrying the mobile device enters this area. Using the location table, the location information is identified, which in turn is used to determine the user's presence status. In an embodiment, user's presence status is determined using the profiles database 208.

TABLE 2

| Location | Presence status |
|---|---|
| Gate A_access point | "Inside Office" |
| Gate B_access point | "Stepped out" |

This presence information can then be used to modify the user's availability as well as to log the physical location of user on the presence server.

Additionally in an exemplary embodiment, the environmental condition of the mobile device is identified, evaluated and leveraged against the presence database calculation threads. The environmental condition of the mobile device includes, but is not limited to, the historical presence status. The environmental conditions of the mobile device may take into account devices that were detected and the additional threads that may have been spawned based on that detection. For example, when a 'Gate A' access point is detected, a thread may begin to monitor for detection of a 'Gate B' access point. Upon successful detection of the 'Gate B' access point, the mobile device may be reconfigured for, for example, being outside the office.

A change trigger rule set in a corporate environment could include trigger rules to look for particular mobile devices which when detected, trigger a presence status update of the user to, for example, 'busy'. A user could, for example, use such a change trigger rule set to change their presence status to 'busy' whenever their mobile device detects a signal corresponding to their supervisor's personal computer (PC) or mobile phone's Bluetooth.

Another change trigger rule set could have change trigger rules to detect a sequence of devices detected in a pre-defined order as the user moves from one location to another. Thus, using such a change trigger rule, a user can be detected to walk out of the office premises based on a sequence of network detections at, for example, Gate A and Gate B, in that order. Thereafter, an appropriate presence status change could be affected.

The change trigger rule sets may be adapted for determining and updating a plurality of presence statuses. One exemplary change trigger rule set is illustrated in table 3.

TABLE 3

| Order of detection | Location | Presence status update | Presence status |
|---|---|---|---|
| 1. | Gate A_access point | No change | "Inside Office" |
| 2. | Gate B_access point | Change | "Stepped out" |

Another change trigger rule set may include change trigger rules to detect a pre-defined status of the detected network(s) as broadcasted by, for example, a Bluetooth device name. Such change trigger rules can be programmed to change presence status of a user at a fixed location by detecting the change in the status information being broadcasted in the surrounding wireless network environment.

The processor 204 selects a profile from the profiles database 208 based at least partially upon the completion of the associated change trigger rule set that has been triggered to generate a change trigger rule. The processor can, for example, select a profile from the profiles database based on a combination of a change trigger rule and other optional conditions such as a user's work or vacation schedule or conditions based on time of the day or day of the week. Based upon the successful activation of a change trigger corresponding to a change trigger rule set, and other optional conditions, where applicable, the processor activates the associated profile on the mobile device 102. In addition to the maintaining of presence status information at the presence database 210 and, where applicable, optional instructions to update the presence status at the presence update database 110, the profile may also include information on mode setting of the mobile device 102 corresponding to each change trigger rule set, communication preferences of the user corresponding to each change trigger rule set and configuration preferences for applications on the mobile device.

The activated profile can alter the working mode of the mobile device, for example, and as recited in Table 4 below, the mobile device may switch to a silent mode from general mode in the scenario where the user walks in a conference room.

TABLE 4

| Presence status | Presence status update | Mode setting | Communication preferences |
|---|---|---|---|
| "Inside Conference Room" | No change | Silent/ Vibrate | Call filter/ Voicemail |
| "Inside Lobby" | Change | General | Receive all calls |

Another exemplary scenario for change in the working mode of a mobile device is now described. A user device can be appropriately programmed using change trigger rule sets to detect the user's home environment by means of Bluetooth or other installed wireless devices at various locations of a user's home. Upon detection that the user is at a specific location, such as a baby's room, and upon the processor applying other optional conditions, such as detecting a late time of the day, the user device automatically activates a profile that changes its working mode to a silent mode.

Yet another exemplary scenario for changing the working mode of a mobile device is as recited in Table 5 below.

TABLE 5

| Network Device name | Mode setting | Communication preferences |
|---|---|---|
| "Conference Room - Silent" | Silent/ Vibrate | Call filter/ Voicemail |
| "Conference Room - Secure" | Disable audio recording | Filter all calls |

In this scenario, the mobile device detects the status message broadcasted by a wireless device, for example the device name as broadcasted by a Bluetooth device. Thereafter, appropriate changes, corresponding to the change trigger rule defined for such detection, are made either to the working mode of the device or communication preferences of the device or both.

Other implementations of this can be used to disable particular features or functionalities of a mobile device. For example, a user device, upon detecting a public toilet could be forced to activate a profile which disables its camera and video recording functionalities. Similarly, a voice recording functionality of the mobile device can be disabled upon detection of a secure environment.

The activated profile may also include communication preferences such as call forwarding to another number, switching to voicemail and the like. For example, a user device can be appropriately programmed using change trigger rule sets and other conditions such as the user's vacation schedule, to update a user's presence status to 'On Vacation'. Thereafter, a profile is activated on the user device that enables the user device to accept phone calls only from a supervisor or a family member and re-direct all other calls to voice-mail. The profile can also re-configure e-mail or instant message preferences of the mobile device to show e-mails or instant messages from a specified sender.

Similarly the teachings of the system described in FIG. 2 can be extended to other environments for example home, wherein either the mode or communication preferences or both of a mobile device corresponding to a home/night profile may be triggered upon detection of home environment and optionally time schedule. Accordingly, the presence status of the user can also be updated on a presence database or a presence server.

Once the instructions to update the presence status at the presence update database are issued, the updated presence status information may also be utilized by various other service providers for example, advertising, passing alerts information and the like. The updated presence status at the presence update database 110 can also be used to track the physical location of individuals or to provide enhanced emergency services, for example, 911, emergency medical services ("EMS"), or the fire department.

Figure 3:
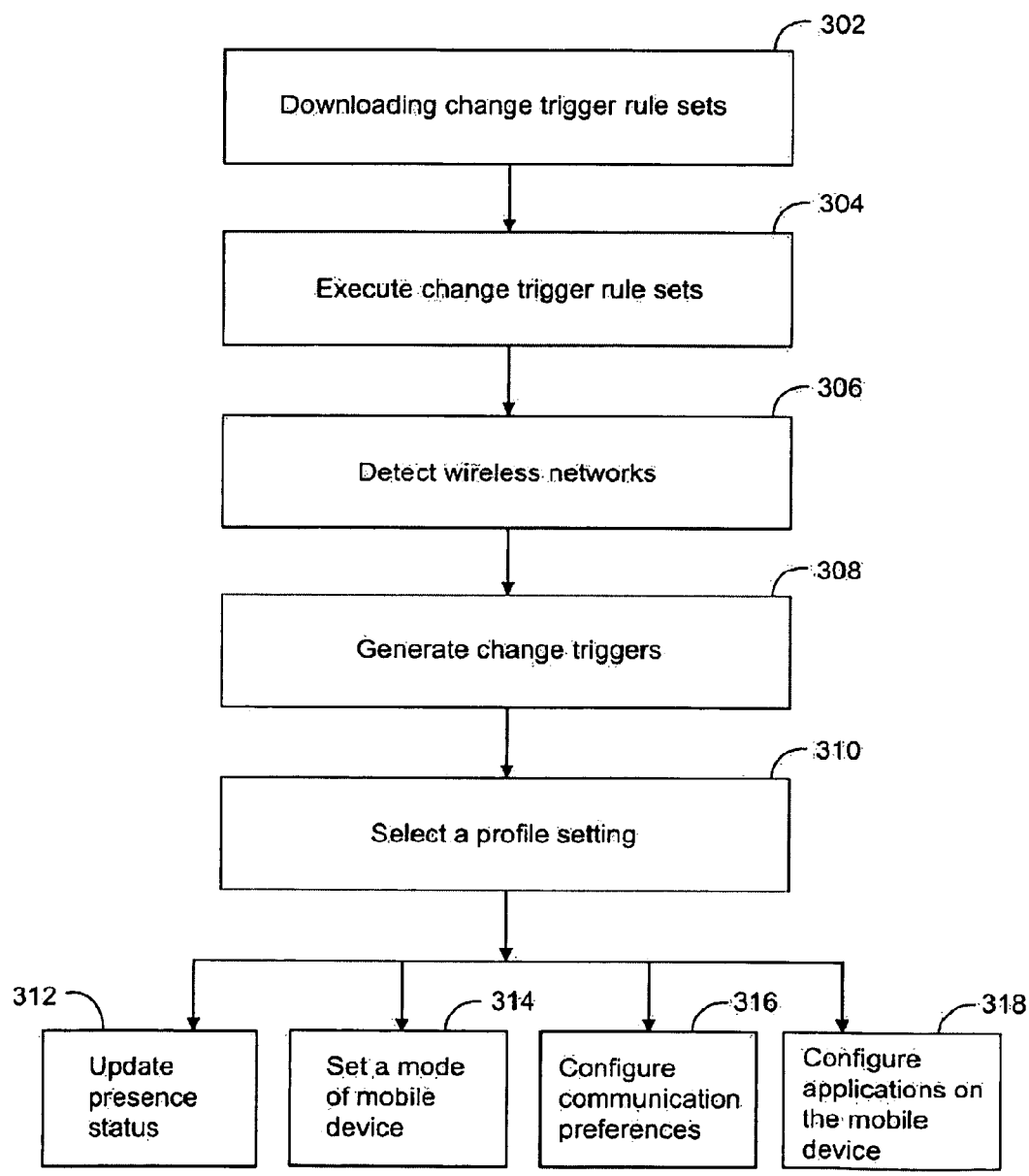
FIG. 3 is a flow diagram representation of the method in accordance with an embodiment.

FIG. 3 is a flow diagram representation of the method in accordance with an embodiment and depicts a method for dynamically updating and using presence information of a user of a mobile device. At step 302, the mobile device retrieves change trigger rule sets from a change trigger rule sets database 112. The change trigger rule sets comprise of change trigger rules. The change trigger rules are logical conditions that are programmed to trigger presence status change in response to changes in the user's current location, surroundings conditions, and availability status.

The change trigger rule sets are downloaded from a change trigger rule set server to the mobile device in response to a user command or the user activating a service provided by the service provider or alternately the change trigger rule sets can be automatically uploaded to the mobile device by the change trigger rule sets database 112 by a push mechanism at the database 112. Once present on the mobile device, the change trigger rule sets are executed by processor 204 in step 304 such that a separate process thread runs for each change trigger rule set on the processor 204.

At step 306, wireless networks corresponding to one or more of mobile device(s) 108, wireless access points 104 (1)-104(5), GSM base station 106 are detected at the one or more wireless interfaces 202 (1)-202 (3) of the mobile device 102. As mentioned earlier, the detection of wireless networks or devices or both at the wireless interfaces is not meant to subscribe, register or accept connections to these detected networks or devices or both. The detected networks can be identified to correspond with one of the surrounding mobile devices by means such as, but not limited to, network SSID information.

At step 308, the wireless network detected information is monitored by the process threads to trigger a change trigger rule in accordance with the information derived from the change trigger rule set executed on the process thread. The change trigger rule set could contain one or more consecutive triggers. For example, one or more change triggers could also have a pre-defined order of execution. In such a case, a process thread successfully triggers a change only on triggering of all the trigger rules in the pre-defined order. For example, a change trigger may be defined to take place after a telecommunication network is detected in a building followed by the detection of a WiFi network in a floor in the building and then a Bluetooth device in a particular room on the floor. In another example, a change trigger may be defined to take place after three Bluetooth devices, 'Building_Gate_1', 'Building_Gate_2', and 'Building_Gate_3', are encountered in a particular order. If these three devices are encountered in one order, a change trigger for entering the building may be invoked, while if they are encountered in the opposite order, a change trigger for exiting the building may be invoke In step 310, upon successful triggering of all rules contained in the corresponding change trigger rule set in the pre-defined order, the process thread checks for the currently active profile on the mobile device 102, and if necessary, changes the active profile as defined in the change trigger rule set. The active profile may contain instructions for at least one of (1) updating the presence update database 110 (step 312); (2) setting the mode of the mobile device (step 314); (3) configuring the communication preferences (step 316) and (4) configuring preferences for applications on the mobile device (step 318). Example of step 312 includes publishing the presence information to a presence server, for example, a SIP presence server. Examples of step 314 include changes such as setting a ring tone of the mobile device, setting the mobile device to a handsfree mode, setting speaker phone mode of the mobile device or setting auto-answer settings of the mobile device. Examples of step 316 include setting the device to forward telephone calls to a specified phone, setting call filtering options of the mobile device, activating voicemail, setting instant messaging options or email options of the mobile device. Examples of step 318 include disabling all recording devices on a mobile device when it is in a conference room which has been set for 'secure'. In various embodiments, the application will disable internal software, and possibly hardware, devices that have recording capabilities such as a camera, video/audio recording. The mobile device may possibly be set to MUTE, if it is off-hook. Further examples of step 318 include seamlessly switching an active call from one network to another based on network availability and/or user-defined preferences. For example, on a dual mode phone, a solution such as Avaya's™ One-X™ Mobile solution may be configured to perform such a switching in response to detecting a change in location. A user on a phone call could have her active call switched automatically from leveraging her office's WiFi network to the PSTN's wireless phone network as she exits her office building. Another example would be a location based security feature for mobile devices. It is advisable that mobile devices are always secured by a password. However, most user's fail to do this because of the inconvenience of always having to enter the password prior to using the device. In various embodiments of the present invention, the mobile device may be configured to automatically switch to an unlocked state when the device is securely in the user's office space or home, and re-secure when the device is in any other environment. Historically, such a security feature could have been circumvented by a well informed information thief by tracking the user to their home or office and standing outside the building to get the device to unlock itself. However, the proposed solution may be used to configure the mobile device to only unlock itself after it has passed through a series of signaling points to be sure that the mobile device is conclusively within the secure environment and not just close to it. Similarly, the mobile device can be configured to automatically re-lock itself when the user exits the secure space by any one of a range of physical paths.

It would be understood that the invention can be practiced using various embodiments described above individually or in combination. Similarly, various other embodiments and modifications to the invention will be apparent to those skilled in the art without departing form the spirit and scope of the inventions as defined in the appended claims. For example, use of the invention could be extended to include the user's home, enabling a user to set preferences for different rooms/environments. Similarly, the invention could also be extended to being used in Libraries, theater, operas, etc. These changes and modifications can be made without departing from the spirit and the scope of the invention and without diminishing its attendant advantages. It is therefore intended that such changes and modifications be covered by the following claims.

What is claimed is:

1. A method for dynamically using presence information of a user of a mobile device, the method comprising:
   detecting, at the mobile device, at least two of a wireless network and a device using at least one wireless interface of the mobile device;
   identifying an environmental condition of the mobile device that includes determining a sequence in which the at least two of the wireless network and the device are detected at the mobile device;
   comparing the sequence to one or more predefined sequences;
   generating presence information of the user of the mobile device based on the comparison;
   configuring communication handling preferences for the user of the mobile device based on the generated presence information; and
   changing an identity of the mobile device.

2. The method of claim 1, wherein the configuring the communication handling preferences is according to a set of change trigger rules in addition to being based on the generated presence information, and further comprising:
   setting, by the microprocessor, a mode of the mobile device based on the generated presence information according to the set of change trigger rules, wherein setting the mode of the mobile device comprises at least one of:
   setting a ring tone of the mobile device;
   setting the mobile device to a hands-free mode;
   setting a speaker phone mode of the mobile device; and
   setting auto-answer settings of the mobile device.

3. The method of claim 1, wherein the detecting step further comprises detecting status information of the wireless connections along with the detection of the wireless connections.

4. The method of claim 1, wherein the wireless network and the device include an unrecognized wireless network.

5. The method of claim 1, wherein the configuring the communication handling preferences is according to a set of change trigger rules in addition to being based on the generated presence information, wherein the mobile device is connected with a database and further comprising at least one of updating the generated presence information of the user on the database and downloading the set of change trigger rules from the database, wherein the database comprises one or more of presence information and sets of change trigger rules for a corporation that the user is a part of or has access to information therein.

6. The method of claim 1, wherein the configuring the communication handling preferences is according to a set of change trigger rules in addition to being based on the generated presence information, and wherein the set of change trigger rules comprises one or more rules based on a sequence of a combination of various wireless networks coming into and going out of range of the mobile device.

7. The method of claim 1, wherein the configuring the communication handling preferences is according to a set of change trigger rules in addition to being based on the generated presence information, and wherein the set of change trigger rules comprises one or more rules based on one or more of a present date, a present time, or a schedule of a calendar of the user.

8. The method of claim 1, wherein the configuring the communication handling preferences is according to a set of change trigger rules in addition to being based on the generated presence information, and wherein the set of change trigger rules comprises one or more rules based on one or more of the mobile device detecting a pre-defined wireless network, the mobile device detecting a plurality of wireless networks in a pre-defined sequence, the mobile device failing to detect a plurality of wireless networks in a pre-defined sequence, the mobile device detecting simultaneously a pre-defined set of wireless networks, or the user manually overriding the generated presence information.

9. The method of claim 1, wherein the configuring the communication handling preferences is according to a set of change trigger rules in addition to being based on the generated presence information, and wherein the change trigger rules are logical conditions that are programmed to trigger a presence status change in response to changes in a current location of the user, surrounding conditions of the user, and an availability status of the user.

10. The method of claim 1, wherein configuring the communication handling preferences comprises setting call forwarding options of the mobile device.

11. The method of claim 1, wherein configuring the communication handling preferences comprises setting call filtering options of the mobile device.

12. The method of claim 1, wherein configuring the communication handling preferences comprises setting voicemail options of the mobile device.

13. The method of claim 1, wherein configuring the communication handling preferences comprises setting instant messaging options of the mobile device.

14. The method of claim 1, wherein configuring the communication handling preferences comprises e-mailing preferences of the mobile device.

15. A method for dynamically using environmental information of a user of a mobile device, the method comprising:
    detecting, at the mobile device, at least one of a wireless network and a device using at least one wireless interface of the mobile device;
    identifying an environmental condition of the mobile device that includes determining a sequence of the at least two of the wireless network or the device;
    comparing the sequence to one or more predefined sequences;
    generating presence information of the user of the mobile device based on the comparing;
    performing at least one of:
        setting a mode of the mobile device based on the generated presence information and according to a set of change trigger rules; and
        configuring communication handling preferences of the mobile device based on the generated presence information and according to the set of change trigger rules; and
    changing an identity of the mobile device.

16. The method of claim 15, wherein the mode of the mobile device is set based on the generated presence information and according to the set of change trigger rules, and wherein setting the mode of the mobile device comprises at least one of:
    setting, by the microprocessor, a ring tone of the mobile device;
    setting, by the microprocessor, the mobile device to a hands-free mode;
    setting, by the microprocessor, a speaker phone mode of the mobile device; or
    setting, by the microprocessor, auto-answer settings of the mobile device.

17. The method of claim 15, wherein communication handling preferences of the mobile device are configured based on the generated presence information and according to the set of change trigger rules, and wherein configuring the communication handling preferences comprises:
    setting, by the microprocessor, call forwarding options of the mobile device;
    setting, by the microprocessor, call filtering options of the mobile device;
    setting, by the microprocessor, voicemail options of the mobile device;
    setting, by the microprocessor, instant messaging options of the mobile device; or
    setting, by the microprocessor, e-mailing preferences of the mobile device.

18. The method of claim 15, further comprising:
    modifying at least one application running on the mobile device based on the presence information.

19. The method of claim 18, wherein prior to generating the presence information of the user of the mobile device, the method further comprises:
    identifying a location of the mobile device based on a sequence in which the wireless network and the device are detected at the mobile device, wherein the wireless network and the device are located within a geographical boundary of an entity, and wherein the identified location is within the geographical boundary.

20. A mobile device, comprising:
    a microprocessor operable to:
    detect at least two locations by detecting at least one of a wireless network and a device using at least one wireless interface of the mobile device;
    identify a sequence in which the at least two locations are detected at the mobile device;
    compare the sequence to one or more predefined sequences;
    generate presence information of the user of the mobile device based on the comparison and an identified location of the mobile device;
    configure communication handling preferences for the user of the mobile device based on the generated presence information and according to a set of change trigger rules; and
    change an identity of the mobile device.

21. The mobile device of claim 20, wherein the configuration of the communication handling preferences comprises setting call forwarding options of the mobile device.

22. The mobile device of claim 20, wherein the configuration of the communication handling preferences comprises setting call filtering options of the mobile device.

23. The mobile device of claim 20, wherein the configuration of the communication handling preferences comprises setting voicemail options of the mobile device.

24. The mobile device of claim 20, wherein the configuration of the communication handling preferences comprises setting messaging options of the mobile device.

25. The mobile device of claim 20, wherein the configuration of the communication handling preferences comprises setting e-mailing preferences of the mobile device.

26. The mobile device of claim 20, wherein the configuration comprises setting a mode of the mobile device and setting the mode of the mobile device comprises at least one of:
    setting a ring tone of the mobile device;
    setting the mobile device to a hands-free mode;
    setting a speaker phone mode of the mobile device; or
    setting auto-answer settings of the mobile device.

27. The mobile device of claim 20, wherein the detection further comprises detecting status information along with the detection of the at least two of the wireless network and the device, and wherein the status information is used in comparing the sequence to one or more predefined sequences.

28. The mobile device of claim 20, wherein the mobile device is connected with a database, wherein the microprocessor is programmed to at least one of update the generated presence information of the user on the database or download the set of change trigger rules from the database, and wherein the database comprises one or more of presence information and sets of change trigger rules for an entity that the user is a part of or has access to information therein.

29. The mobile device of claim 28, wherein the microprocessor identifies a location based on the sequence, wherein the at least one of the wireless network or device are located within a geographical boundary of the entity, the entity being a corporation, and wherein the identified location is within the geographical boundary.

30. The mobile device of claim 20, wherein the set of change trigger rules comprises one or more rules based on a sequence of a combination of various wireless networks coming into and going out of range of the mobile device.

31. The mobile device of claim 20, wherein the set of change trigger rules comprises one or more rules based on one or more of a present date, a present time, or a schedule of a calendar of the user.

32. The mobile device of claim 20, wherein the set of change trigger rules comprises one or more rules based on one or more of the mobile device detecting a pre-defined wireless network, the mobile device detecting a plurality of wireless networks in a pre-defined sequence, the mobile device failing to detect a plurality of wireless networks in a pre-defined sequence, the mobile device detecting simultaneously a pre-defined set of wireless networks, or the user manually overriding the generated presence information.

33. The mobile device of claim 20, wherein the change trigger rules are logical conditions that are programmed to trigger a presence status change in response to changes in a current location of the user, surrounding conditions of the user, and an availability status of the user.

34. A tangible and non-transient computer readable medium comprising microprocessor executable instructions that, when executed, perform the at least following steps:
    detecting, at a mobile device, at least one of a wireless network and a device using at least one wireless interface of the mobile device;
    identifying an environmental condition of the mobile device that includes determining a sequence of the at least two of the wireless network or the device;
    comparing the sequence to one or more predefined sequences;
    generating presence information of the user of the mobile device based on the comparing;
    performing at least one of:
        setting a mode of the mobile device based on the generated presence information and according to a set of change trigger rules; and
        configuring communication handling preferences of the mobile device based on the generated presence information and according to the set of change trigger rules; and
    changing an identity of the mobile device.

35. The computer readable medium of claim 34, wherein a mode of the mobile device is set based on the generated presence information and according to a set of change trigger rules, and wherein setting the mode of the mobile device comprises at least one of:
    setting, by the microprocessor, a ring tone of the mobile device;
    setting, by the microprocessor the mobile device to a hands-free mode;
    setting, by the microprocessor a speaker phone mode of the mobile device; or
    setting, by the microprocessor auto-answer settings of the mobile device.

36. The computer readable medium of claim 34, wherein communication handling preferences of the mobile device are configured based on the generated presence information and according to the set of change trigger rules, and wherein configuring the communication handling preferences comprises at least one of:
    setting, by the microprocessor call forwarding options of the mobile device;
    setting, by the microprocessor call filtering options of the mobile device;
    setting, by the microprocessor voicemail options of the mobile device;
    setting, by the microprocessor instant messaging options of the mobile device; or
    setting, by the microprocessor e-mailing preferences of the mobile device.

37. The computer readable medium of claim 34, wherein the microprocessor modifies at least one application running on the mobile device based on the presence information.

38. The computer readable medium of claim 34, wherein the microprocessor, when executing the instructions sets a mode of the mobile device based on the generated presence information according to the set of change trigger rules.

39. The computer readable medium of claim 34, wherein the microprocessor configures the communication handling preferences of the mobile device based on the generated presence information and according to the set of change trigger rules.

\* \* \* \* \*